US010588255B2

(12) United States Patent
Song et al.

(10) Patent No.: US 10,588,255 B2
(45) Date of Patent: Mar. 17, 2020

(54) CHARGING DEVICE OF MOVING ROBOT AND CONTROL METHOD THEREOF (71) Applicant: LG ELECTRONICS INC., Seoul (KR)

(72) Inventors: Hyunsup Song, Seoul (KR); Dongkyun Nam, Seoul (KR); Jongjin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 15/677,912

(22) Filed: Aug. 15, 2017

(65) Prior Publication Data

US 2018/0064023 A1 Mar. 8, 2018

Related U.S. Application Data (60) Provisional application No. 62/383,507, filed on Sep. 5, 2016.

(51) Int. Cl.
*A01D 34/00* (2006.01)
*B60L 53/14* (2019.01)
*G05D 1/02* (2020.01)
*H02J 7/00* (2006.01)
*B60L 53/31* (2019.01)
*B60L 53/35* (2019.01)
*A01D 101/00* (2006.01)
*A01D 34/78* (2006.01)
*B60L 53/12* (2019.01)

(52) U.S. Cl.
CPC ......... *A01D 34/001* (2013.01); *A01D 34/008* (2013.01); *B60L 53/14* (2019.02); *B60L 53/31* (2019.02); *B60L 53/35* (2019.02); *G05D 1/0276* (2013.01); *H02J 7/0027* (2013.01); *H02J 7/0042* (2013.01); *H02J 7/0045* (2013.01); *A01D 34/78* (2013.01); *A01D 2101/00* (2013.01); *B60L 53/12* (2019.02); *G05D 1/0225* (2013.01); *G05D 2201/0208* (2013.01)

(58) Field of Classification Search
CPC .................................................. A01D 34/001
USPC ........................................................ 320/107
See application file for complete search history.

(56) References Cited

U.S. PATENT DOCUMENTS

| 6,389,329 B1* | 5/2002 | Colens | A47L 5/30 700/262 |
| 6,525,509 B1* | 2/2003 | Petersson | A47L 9/009 320/107 |
| 2007/0142964 A1* | 6/2007 | Abramson | A01D 34/008 700/245 |
| 2009/0185036 A1* | 7/2009 | Bowron | G08B 13/19632 348/151 |
| 2013/0221908 A1* | 8/2013 | Tang | B25J 19/005 320/107 |

(Continued)

*Primary Examiner* — Jerry D Robbins
(74) *Attorney, Agent, or Firm* — Dentons US LLP (57) ABSTRACT

A charging device of a robotic lawn mower includes a bottom part installed in a partial region of an operation region of the robot, a support part coupled to the bottom part and positioned on a side of a main body of the robot when the robot is being charged, and a terminal part coupled to the support part and positioned above the main body of the robot when the robot is being charged, wherein the bottom part is formed such that only any one of a plurality of wheels of the robot is mounted thereon when the robot is being charged.

14 Claims, 11 Drawing Sheets

(56) References Cited

U.S. PATENT DOCUMENTS

| | | | | |
|---|---|---|---|---|
| 2014/0031979 A1* | 1/2014 | Borinato | ............... | H02J 7/0027 700/245 |
| 2015/0077045 A1* | 3/2015 | Harris | .................. | G05D 1/0225 320/108 |
| 2015/0328775 A1* | 11/2015 | Shamlian | ............... | B25J 9/1676 700/258 |
| 2015/0366137 A1* | 12/2015 | Markusson | .............. | G05D 1/03 320/107 |

* cited by examiner

CHARGING DEVICE OF MOVING ROBOT AND CONTROL METHOD THEREOF

CROSS-REFERENCE TO RELATED APPLICATION

Pursuant to 35 U.S.C. § 119(a), this application claims the benefit of an earlier filing date of and the right of priority to U.S. Provisional Application No. 62/383,507, filed on Sep. 5, 2016, the content of which is incorporated by reference herein in their entirety.

BACKGROUND OF THE INVENTION

1. Field of the Invention

The present disclosure relates to a charging device of a moving robot and a control method thereof, and particularly, to a charging device of a robotic lawn mower moving on an inner side of a boundary wire and a control method thereof.

2. Background of the Invention

A lawn mower is a machine for cutting grass that grows in a yard of a house, a playing field, and the like. The lawn mower may be classified as a home lawn mower used in houses and a tractor lawn mower used in a large playing field or a large farm.

The home lawn mower includes a walk-behind type lawn mower which requires a human to walk behind and guide the mower to mow the lawn and a hand type lawn mower which a human directly carries with his hand.

However, the two types of lawn mower are cumbersome in that a human should directly operate them.

In particular, in the modern busy daily lives, it is difficult for users to directly operate a lawn mower to mow the lawn of the ground (or a yard), users mostly employ a worker to mow the lawn, incurring cost for employment.

Thus, in order to avoid the additional cost and save a user's trouble, an automatic robot type lawn mower has been developed. Various studies have been conducted in order to control movement performance of such an automatic robot type lawn mower.

In addition, in order to realize automation of power supply to the automatic robot type lawn mower, a charging device of a lawn mower has been developed. Charging performance of a charging device is associated with operation control of an automatic robot, and thus, development of a charging device has also been made in conjunction with research into controlling movement performance of an automatic robot.

SUMMARY OF THE INVENTION

Therefore, an aspect of the detailed description is to provide a charging device of a robotic lawn mower, capable of keeping lawn present in an operation region of the robotic lawn mower, while smoothly supplying power to a robotic lawn mower, and a control method thereof.

Another aspect of the detailed description is to provide a charging device of a robotic lawn mower, capable of minimizing a region shared by an installation region of a charging stand and an operation region of a robotic lawn mower, and a control method thereof.

Another aspect of the detailed description is to provide a charging device of a robotic lawn mower, installed outside of a closed curve distinguished by a boundary wire installed on the edge of an operation region, and a control method thereof.

To achieve these and other advantages and in accordance with the purpose of this specification, as embodied and broadly described herein, a charging device of a robotic lawn mower includes: a bottom part installed in a partial region of an operation region of the robot; a support part coupled to the bottom part and positioned on a side of a main body of the robot when the robot is being charged; and a terminal part coupled to the support part and positioned above the main body of the robot when the robot is being charged, wherein the bottom part is formed such that only any one of a plurality of wheels of the robot is mounted thereon when the robot is being charged.

According to an embodiment related to the present disclosure, the wheel mounted on the bottom part may be any one of main driving wheels installed in the main body of the robot.

According to an embodiment related to the present disclosure, the bottom part may have a plurality of holes.

According to an embodiment related to the present disclosure, a coupling angle between the terminal part and the support part may be changed by an external force.

According to an embodiment related to the present disclosure, the support part may have a concave portion with respect to the main body of the robot, when the robot is being charged.

According to an embodiment related to the present disclosure, an IR sensor may be adhered to a side portion of the support part, and the adhered IR sensor may transmit a preset signal to the robot.

According to an embodiment related to the present disclosure, the support part may include a plurality of rod parts, the plurality of rod parts may have different diameters and sequentially coupled, and when a coupled state of the plurality of rod parts is changed, a length of the support part may be changed.

According to an embodiment related to the present disclosure, the bottom part may include a first bottom member disposed on the ground and a second bottom part embedded underground, wherein at least one of the bottom part, the support part, and the terminal part may enter the inside of the second bottom member according to a change in a mutually coupled state.

According to an embodiment related to the present disclosure, at least one of the bottom part and the support part may include a fastening part connected to a boundary wire installed in a contour line of the operation region.

According to an embodiment related to the present disclosure, the bottom part may be installed such that one surface thereof is in contact with the boundary wire.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2A is another perspective view illustrating an embodiment of a charging device of a moving robot according to the present disclosure.

DETAILED DESCRIPTION OF THE INVENTION

Hereinafter, the embodiments of the present invention will be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

It will be understood that, although the terms first, second, etc. may be used herein to describe various elements, these elements should not be limited by these terms. These terms are only used to distinguish one element from another.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

As used herein, the singular forms "a", "an" and "the" are intended to include the plural forms as well, unless the context clearly indicates otherwise.

It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Figure 1A:
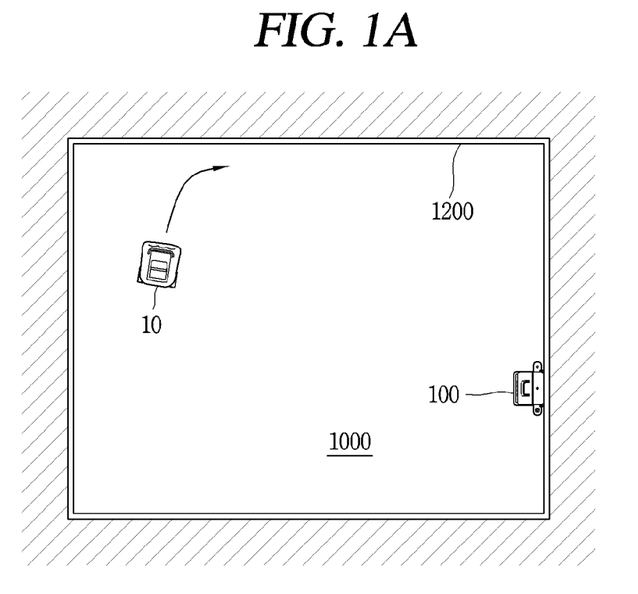
FIG. 1A is a conceptual view illustrating an embodiment in which a charging device of a moving robot is installed in an operation region of the moving robot according to the present disclosure.
Figure 1B:
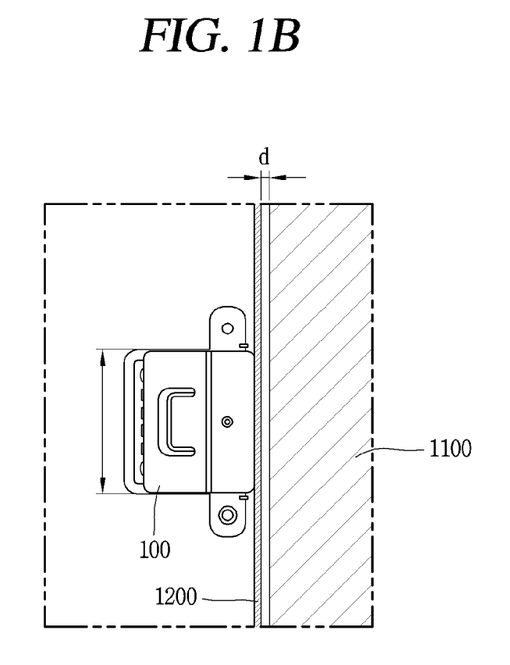
FIG. 1B is another conceptual view illustrating an embodiment in which a charging device of a moving robot is installed in an operation region of the moving robot according to the present disclosure.

FIGS. 1A and 1B are conceptual views illustrating an embodiment in which a charging device 100 of a moving robot 10 is installed in an operation region of the moving robot 10 according to the present disclosure.

Referring to FIG. 1A, a moving robot 10 may travel within a predetermined region. Also, the moving robot 10 may perform a specific function during traveling.

In detail, the moving robot 10 may be a robotic lawn mower. Here, the specific function may be cutting the lawn within the operation region 1000.

Also, the operation region 1000 may be defined by a boundary wire 1200 formed as a closed curve. In detail, the boundary wire 1200 may be installed in a certain region, and the moving robot 10 may move within an region defined by the closed curve formed by the installed boundary wire 1200.

Meanwhile, referring to FIG. 1B, the boundary wire 1200 may be installed within the operation region. In detail, the boundary wire 1200 may be installed in a boundary between the operation region 1000 and an external region 1100, or may be installed to be spaced apart from the external region 1100 at a predetermined distance d. Here, the distance d where the boundary wire 1200 is installed may be modified. Thus, the user may install the boundary wire 1200 along an outer side of the operation region 1000, and since a space in which the boundary wire 1200 is installed from the outer side or the external region 1100 is not required to be considered, the boundary wire 1200 may be more easily installed.

As illustrated in FIG. 1B, the charging device 100 of the moving robot 10 may be installed to be connected to the boundary wire 1200. Meanwhile, although not shown in FIG. 1B, the charging device 100 may be installed in a partial region of the operation region 1000 including an region in which the boundary wire 1200 is installed. Also, although not shown in FIG. 1B, the charging device 100 may be installed in a partial region of the operation region 1000 and a partial region of the external region 1100.

Hereinafter, an embodiment of a robotic lawn mower related to the present disclosure in a case where the moving robot 10 is the robotic lawn mower will be described with reference to FIGS. 1C and 1D.

Figure 1C:
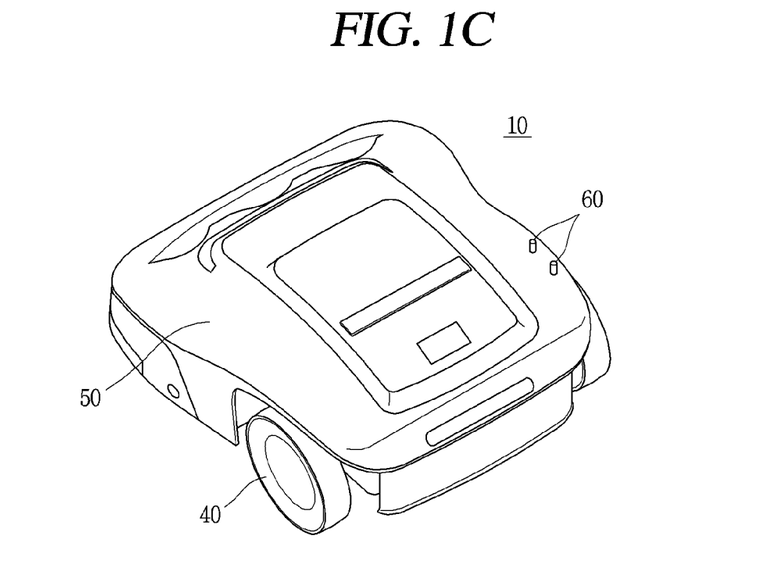
FIG. 1C is a conceptual view illustrating an embodiment of a moving robot according to the present disclosure.
Figure 1D:
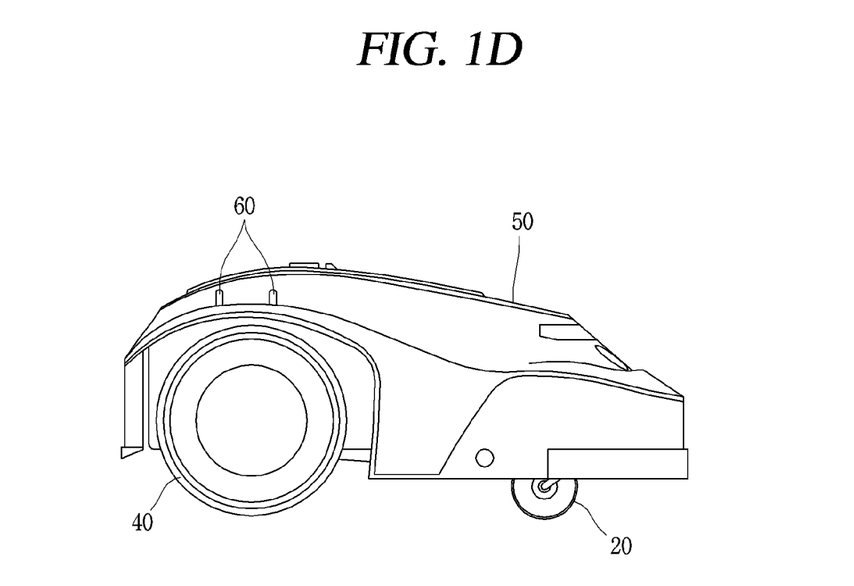
FIG. 1D is another conceptual view illustrating an embodiment of a moving robot according to the present disclosure.

Referring to FIGS. 1C and 1D, the robotic lawn mower 10 may include a body 50 prepared to be movable and cut the lawn. The body 50 may cut the lawn within the operation region 1000, while moving within the boundary wire 1200. Also, the boundary wire 1200 may be connected to the charging device 100 capable of supplying a current to the boundary wire 1200. That is, the boundary wire 1200 may be connected to the charging device 100 and generate a magnetic field by a current supplied from the charging device 100. Also, the body 50 may be coupled to the charging device 100 so as to be charged.

The body 50 of the robotic lawn mower may have a blade unit (not shown) for cutting the lawn. A component for rotating a sharp blade may be disposed in the blade unit.

The body 50 may have a driving unit, and the driving unit may move and rotate the body 50 in a desired direction. The driving unit may include a plurality of rotatable wheels, and each of the wheels may be individually rotated and thus, the body 50 may be rotated in a desired direction. In detail, the driving unit may include at least one main driving wheel 40 and an auxiliary wheel 20. For example, the body 50 may include two main driving wheels 40 and the two main driving wheels 40 may be installed on a lower surface of a rear side of the body 50.

The body 50 may include a sensing unit 30 for sensing the boundary wire 1200. The sensing unit 30 may sense a magnetic field generated by a current flowing in the boundary wire 1200 and a voltage value induced and generated by the magnetic field, and obtain information regarding whether the body 50 has reached the boundary wire 1200, whether the body 50 is present within a closed surface formed by the boundary wire 1200, whether the body 50 is traveling along the boundary wire 1200, and the like.

Also, the sensing unit 30 may sense various types of information regarding a movement distance of the body 50, a movement speed of the body 50, a change in relative position in accordance with movement, and the like.

The body 50 may drive the driving unit 40 using information sensed by the sensing unit 30. That is, a controller 18 may drive the driving unit such that the body 50 is positioned within the operation region by controlling traveling of the body 50 using measured information from the sensing unit 30.

The body 50 may include a sensing unit 30 sensing a voltage value inducted from the boundary wire 1200 and the controller 18 determining a distance between the body 50 and the boundary wire 1200 by the voltage value sensed by the sensing unit 30.

The body 50 may include a power receiving unit 60 which comes into contact with the charging device 100 to receive power therefrom. The power receiving unit 60 may include at least one terminal. In detail, the terminal may be coupled to an elastic part (not shown) so as to be formed to movable vertically. The power receiving unit 60 may be installed on an upper side of any one of the main driving wheels 40 of the driving unit. Also, the power receiving unit 60 may be installed to be exposed upwardly from the body 50.

Hereinafter, an embodiment of a charging device of a moving robot according to the present disclosure will be described with reference to FIGS. 2A to 2D.

Figure 2A:
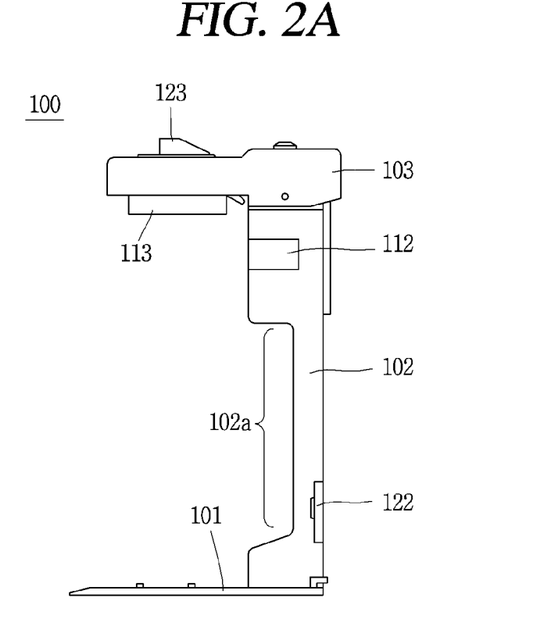
FIG. 2A is a perspective view illustrating an embodiment of a charging device of a moving robot according to the present disclosure.

Referring to FIG. 2A, the charging device 100 of a moving robot according to the present disclosure may include at least one of a bottom part 101, a support part 102, and a terminal part 103.

As illustrated in FIG. 2A, the bottom part 101, the support part 102, and the terminal part 103 may be independently provided. Also, the charging device 100 may be formed by coupling the independently formed bottom part, support part, and terminal part. At least one of the bottom part, the support part, and the terminal part may be coupled by a hinge (not shown). Also, at least one of the bottom part, the support part, and the terminal part may be coupled by coupling unit (not shown).

Meanwhile, although not shown, at least one of the bottom part, the support part, and the terminal part may be integrally formed.

In detail, the bottom part 101 may be installed in at least a portion of an operation region of the moving robot. Also, the bottom part 101 may be configured to be installed in only anyone of a plurality of wheels of the robot, when the robot is being charged.

For reference, in the disclosure described hereinafter, when it is assumed that the robotic lawn mower is being charged, a direction with respect to a main body of the robot will be defined as a front side of the support part 102 and a direction opposite to the direction with respect to the main body will be described as a rear side of the support part 102. Also, a direction of a normal direction of the ground will be defined as an upper side of the support part 102 and a direction opposite to the normal direction will be defined as a lower side of the support part 102. Also, the other remaining two directions except the front side, rear side, upper side, and lower side will be defined as a lateral side.

Similarly, a front side, a rear side, a lateral side, an upper side, and a lower side of the bottom part 101 and the terminal side 103 will be defined.

Figure 2B:
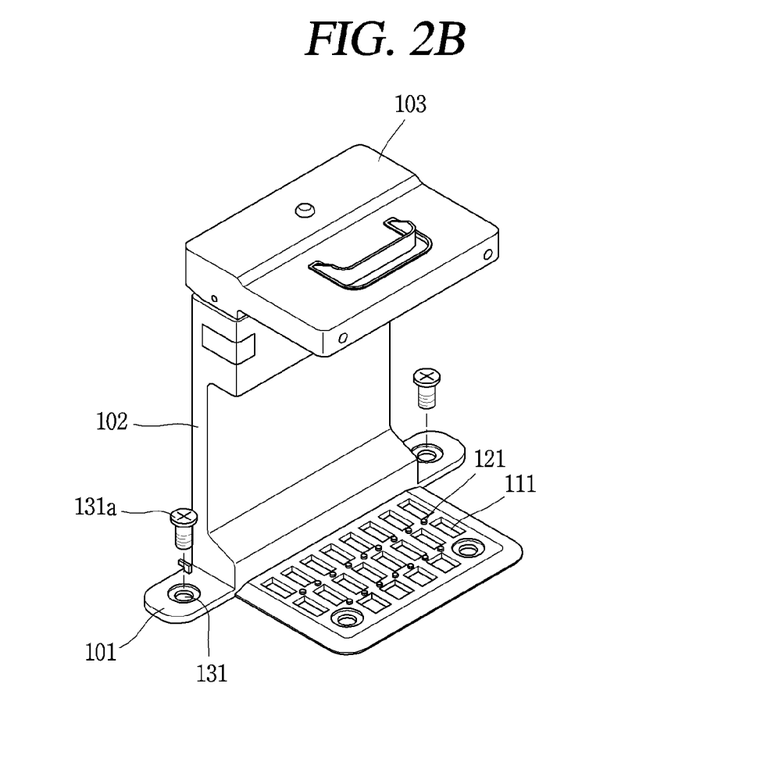
FIG. 2C is yet another perspective view illustrating an embodiment of a charging device of a moving robot according to the present disclosure.
FIG. 2D is still yet another perspective view illustrating an embodiment of a charging device of a moving robot according to the present disclosure.
Figure 2C:
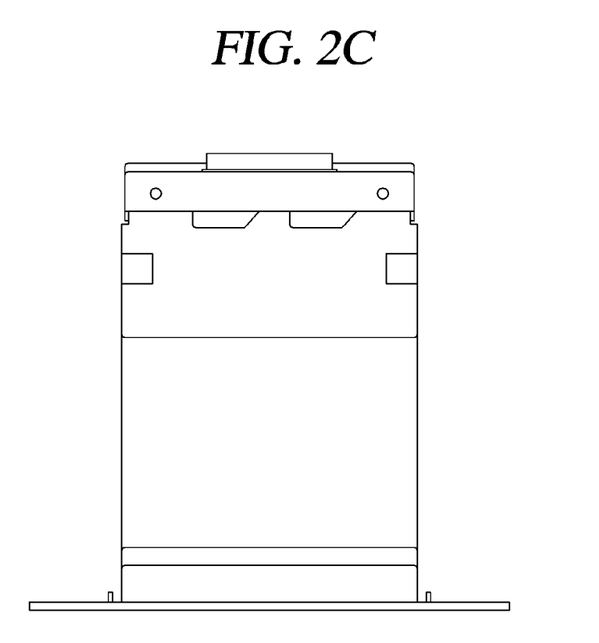
Figure 2D:
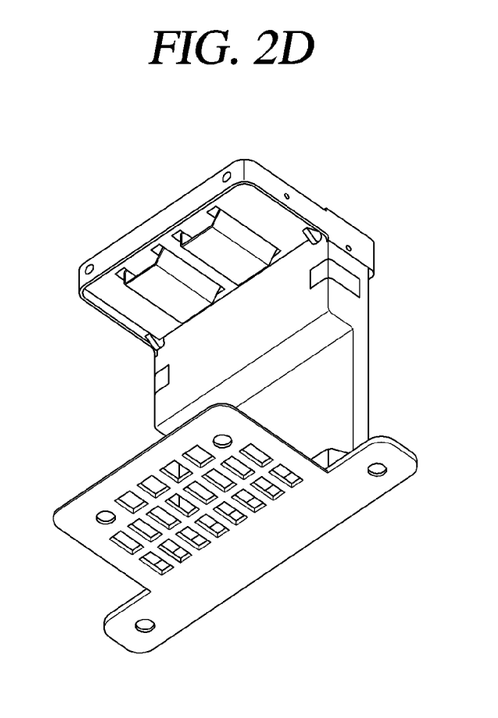

As illustrated in FIG. 2B, a plurality of holes 111 may be provided on the bottom part 101. Also, the bottom part may include a protrusion 121 between a first portion and a second portion where the plurality of holes are present. Here, since grass present in a partial region where the bottom part 101 in the operation region is installed may grow through the plurality of holes 111, damage to lawn may be minimized. In addition, the protrusion 121 may increase a grip force between the main driving wheels of the moving robot and the bottom part.

Although not shown in FIG. 2B, a larger number of holes 111 may be formed in the second portion of the bottom part not in contact with the wheels of the moving robot, than in the first portion of the bottom part in contact with the wheels of the moving robot, when the moving robot is being charged. In another example, a size of the plurality of holes provided in the second portion may be greater than that of a plurality of holes provided in the first portion.

Also, referring to FIG. 2B, the bottom part 101 may include a fastening part 131 for fixing to the operation region. The fastening part 131 may include a fastening hole having a predetermined size, and a fastening member 131*a* may be fastened to the ground through the fastening hole formed in the fastening part 131 to fix the bottom part 101 to the ground. In FIG. 2B, it is illustrated that the fastening part and the fastening hole are formed on both sides of the bottom part, respectively.

Meanwhile, although not shown in FIG. 2B, the fastening part 131 may be fastened to a boundary wire 1200. When the charging device 100 and the boundary wire 1200 are provided with electric power from the same power source, the boundary wire 1200 may be supplied with a current through the fastening part 131.

Here, the fastening part 131 may have a current supply terminal (not shown). Also, the fastening part 131 may have a binding part (not shown) for binding the boundary wire 1200.

Meanwhile, in FIG. 2B, an embodiment in which a disposition position of the fastening part is both sides of the bottom part is illustrated, but the present disclosure is not limited thereto. That is, the fastening part may be disposed on both sides of the support part 102. Here, the fastening part may be connected to the boundary wire installed in an contour line of the operation region of the robotic lawn mower.

In detail, at least one of the bottom part and the support part may include a fastening part connected to the boundary wire installed in the contour line of the operation region.

Also, the bottom part may be installed such that one surface thereof is in contact with the boundary wire. For example, one surface of the bottom part in contact with the boundary wire may be a rear surface of the bottom part.

In this manner, since the fastening part is disposed on both sides of the bottom part or the support part, it may be easy to align the charging device of the robotic lawn mower according to the present disclosure in a specific direction with respect to the boundary wire 1200.

Referring to FIGS. 2A to 2D, the support part 102 may be coupled to the bottom part 101. At least one of the support part 102 and the bottom part 101 may include a coupling member (not shown) for mutual coupling.

When the mobile robot is being charged, the support part 102 may be positioned on the side of the main body of the moving robot. The support part 102 may have a concave portion 102*a* not in contact with the wheel 40 of the moving robot when the moving robot is being charged. That is, the support part 102 may have a first support (i.e., the concave portion 102*a*) having a first thickness and a second support having a second thickness and coupled to at least one of the bottom part 101 and the terminal part 103 to support the charging device.

Meanwhile, a sensor 112 may be adhered to a side of the support part 102. In detail, the sensor 112 may be an IR sensor.

The adhered IR sensor 112 may transmit a preset signal to the moving robot or may receive a preset signal from the moving robot. In detail, the preset signal may include information related to a position of the charging device or whether the charging device is available for charging.

Also, a wire cap 122 may be provided on a rear surface of the support part 102. The wire cap 122 may cover a binding member of the charging device 100 and the boundary cover 1200 when the charging device 100 and the boundary wire 1200 are connected to the same power source. An embodiment of the wire cap 122 will be described in detail with reference to FIG. 7 hereinafter.

Referring to FIGS. 2A to 2D, the terminal part 103 may be coupled to the support part 102. In detail, an angle at which the terminal part 103 and the support part 102 may be changed by an external force.

At least one terminal 113 may be installed on a lower surface of the terminal part 103. The terminal 113 installed on the lower surface of the terminal part 103 may come into contact with the power receiving unit 60 of the moving robot 10 (please refer to FIGS. 1C and 1D) to supply power to the moving robot 10.

In an embodiment, an elastic member (not shown) may be provided between the terminal 113 and the terminal unit 103. Accordingly, a length of the terminal 113 protruding by an external force may be changed.

In another example, the terminal 113 may be formed of an elastic material. That is, the terminal 113 may be bent by an external force, and accordingly, a degree to which the terminal protrudes may be changed.

Meanwhile, although not shown in FIGS. 2A to 2D, the terminal unit 103 may wirelessly supply power to the moving robot 10. Here, the terminal unit 103 may have a wireless power transmitting unit (not shown) and the moving robot 10 may have a wireless power receiving unit (not shown). Here, even in a state in which the terminal unit 103 and an upper surface of the moving robot 10 are spaced apart from each other by a predetermined distance, the charging device 100 may supply power to the moving robot 10.

As illustrated in FIGS. 2A to 2D, a handle 123 may be installed on an upper surface of the terminal unit 103. A relative coupling position of the terminal unit 103 and the support part 102 may be changed by an external force applied to the handle 123.

An embodiment of a charging device coupled to a moving robot according to the present disclosure will be described with reference to FIGS. 3A to 3D.

Figure 3A:
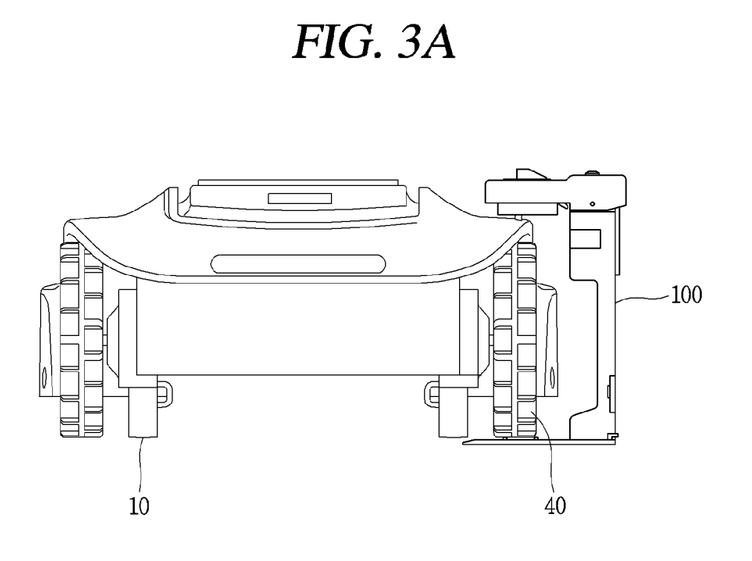
FIG. 3A is a view illustrating an embodiment of a charging device coupled to a moving robot according to the present disclosure.
Figure 3B:
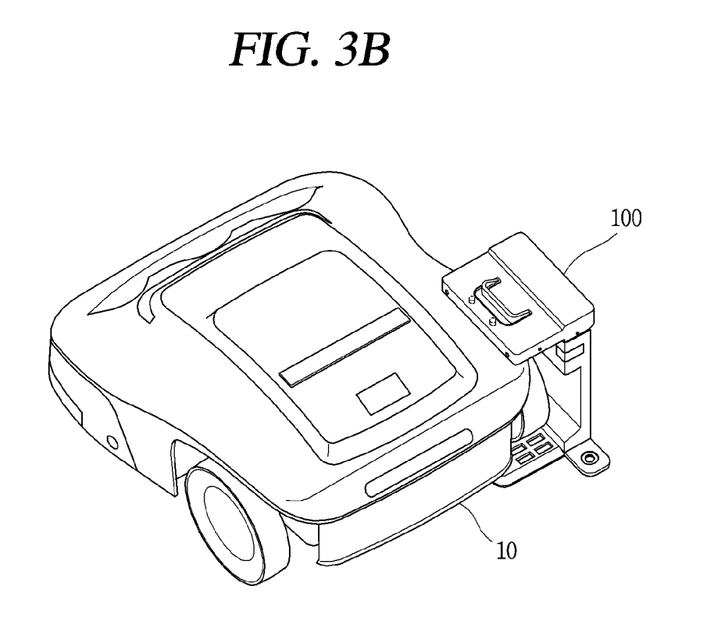
FIG. 3B is another view illustrating an embodiment of a charging device coupled to a moving robot according to the present disclosure.

As illustrated in FIGS. 3A and 3B, when the moving robot 10 is being charged, the bottom part of the charging device 100 may be configured such that only any one of the plurality of wheels 40 provided in the moving robot 10 is mounted thereon.

In detail, the wheel 40 mounted on the bottom part 101 may be a main driving wheel installed in the main body of the moving robot. In another example, the main driving wheel may be installed on a rear side of the main body of the moving robot.

As illustrated in FIG. 3A, the bottom part 101 may have a quadrangular shape, and here, a length of the side of the bottom part 101 may be larger than a width of the wheel of the moving robot 10.

Also, referring to FIG. 3A, a length of the front side or the rear side of the bottom part 101 may be larger than a diameter of the wheel of the moving robot 10. however, the bottom part 101 of the charging device 100 according to the present disclosure is not limited thereto.

In another example, the length of the front side or rear side of the bottom part 101 may equal to or larger than a contact area between the wheel and the ground when the wheel of the moving robot 10 comes into contact with the ground. Here, the area of the bottom part 101 may be minimized to increase operation efficiency of the moving robot 10, and thus, minimizing damage to the lawn.

Figure 3C:
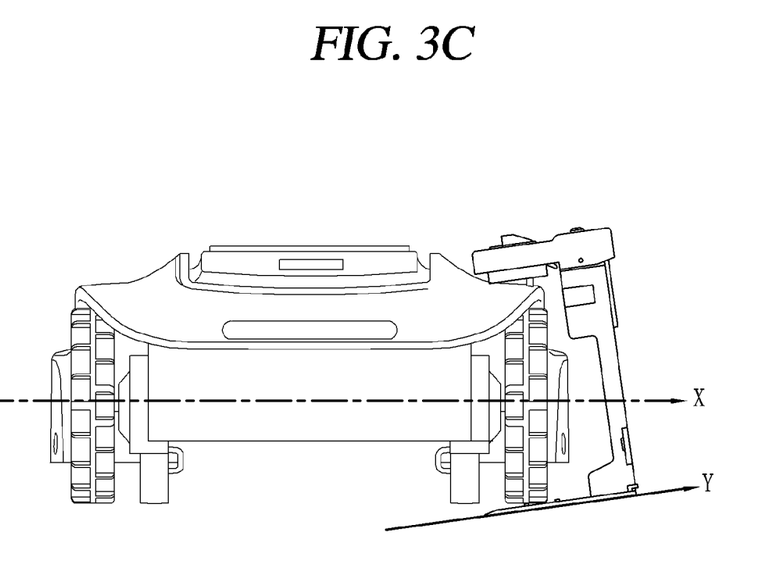
FIG. 3C is yet another view illustrating an embodiment of a charging device coupled to a moving robot according to the present disclosure.
Figure 3D:
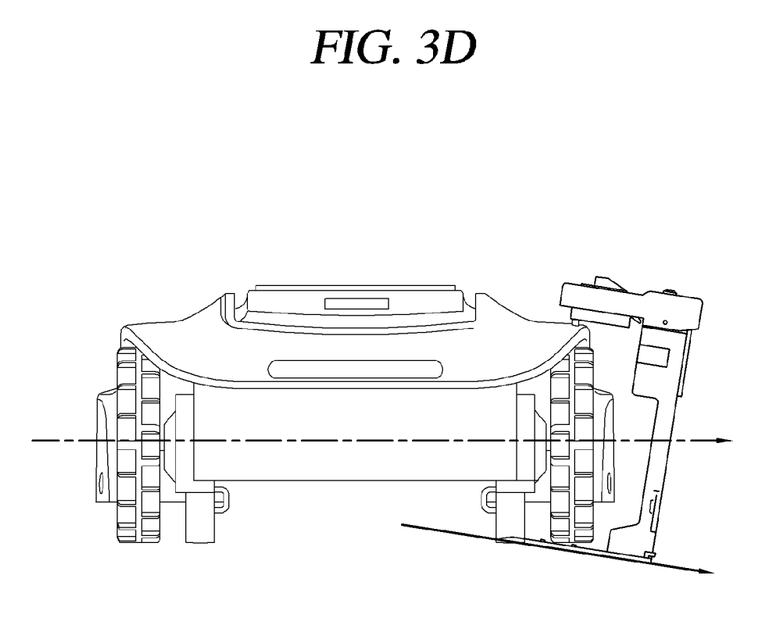
FIG. 3D is still yet another view illustrating an embodiment of a charging device coupled to a moving robot according to the present disclosure.

Referring to FIGS. 3C and 3D, when an absolute value of an angle ($\alpha$) between a rotational shaft of the wheel 40 of the moving robot 10 and a plane of the bottom part 10 is within a preset range, the terminal 113 provided in the terminal part 103 of the charging device 100 may be maintained to be in contact with the power receiving unit 60 of the moving robot 10.

That is, when an absolute value of the angle (α) between the rotational shaft of the wheel 40 of the moving robot 10 and the plane of the bottom part 10 is within the preset range, the charging device 100 may supply electric power to the moving robot through the terminal part 103. For example, the preset range may a range from 0° to 10°.

Although not shown in FIGS. 3C and 3D, when an absolute value of the angle (α) is within the preset range, a coupling angle of the terminal part 103 and the support part 102 may be changed to maintain the contact between the terminal 113 and the power receiving unit 60.

In another example, a relative coupling position of the terminal part 103 and the terminal 113 provided on a lower surface of the terminal part 103 may be changed. Here, the terminal 113 may be formed of a magnetic material, and the terminal 113 formed of a magnetic material may be moved in a state of being coupled with a lower surface of the terminal part 103 so as to be in contact with the power receiving unit 60 formed of a metal.

In another example, an elastic member (not shown) may be provided between the terminal 113 and the terminal part 103, and the elastic member may change a degree of protruding of the terminal 113. Accordingly, although an entering posture of the moving robot 10 is changed, contact between the power receiving unit 60 and the terminal 113 may be maintained.

Thus, although the plane of the operation region 1000 is not smooth, the charging device 100 according to the present disclosure may be able to effectively supply electric power to the moving robot 10. That is, the charging device 100 according to the present disclosure may effectively supply electric power with respect to various postures of the moving robot 10 which has entered the charging device.

Hereinafter, an embodiment of the terminal part of the charging device of the moving robot according to the present disclosure will be described with reference to FIGS. 4A and 4B.

Figure 4A:
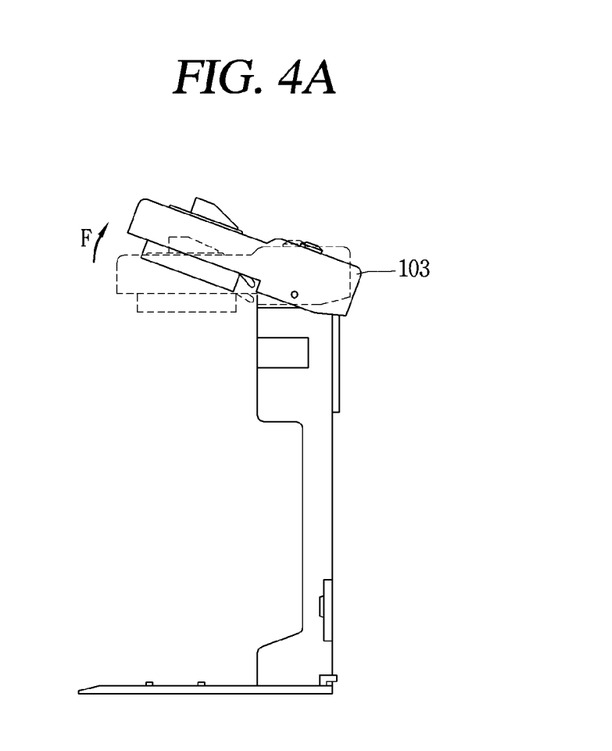
FIG. 4A is a view illustrating an embodiment of a terminal unit of a charging device of a moving robot according to the present disclosure.

Referring to FIG. 4A, a coupling angle of the terminal part 103 and the support part 102 of the charging device 100 may be changed by an external force. in detail, in a state in which a first external force is applied to the terminal part 103 in a direction horizontal to the ground, when a second external force is applied in a direction perpendicular to the ground, the coupling angle of the terminal part 103 and the support part 102 may be changed.

An embodiment of a coupling portion 400 of the terminal part 103 and the support part 102 will be described with reference to FIG. 4B. As illustrated in FIG. 4B, the terminal part 103 and the support part 102 may be coupled by a hinge part 402. Also, the terminal part 103 and the support part 102 may be coupled to both ends of a spring 401. Accordingly, when an external force applied to the terminal part 103 is removed, the coupling angle of the terminal part 103 and the support part 102 may be returned to an initial value. For example, the initial value may be 90°.

Figure 4B:
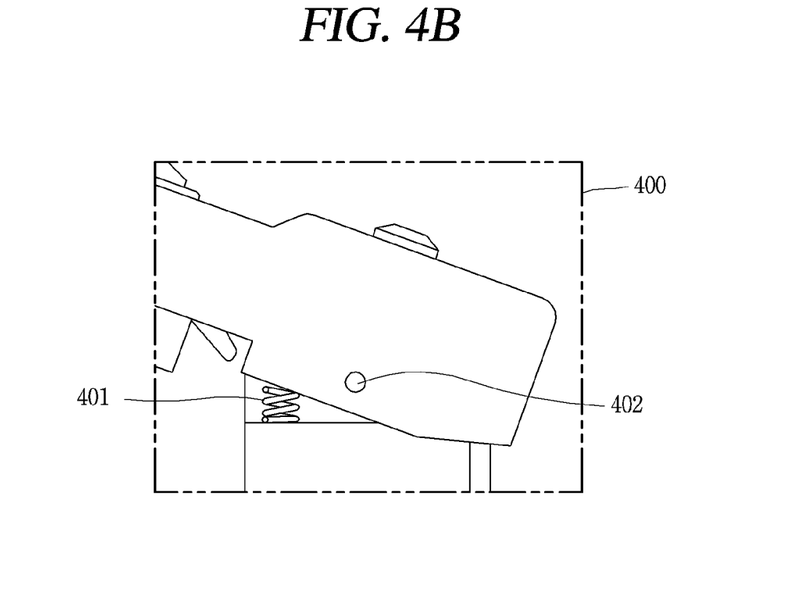
FIG. 4B is another view illustrating an embodiment of a terminal unit of a charging device of a moving robot according to the present disclosure.

Meanwhile, in FIG. 4B, an embodiment in which the terminal part 103 and the support part 102 are coupled to both ends of the spring 401 is illustrated, but the present disclosure is not limited thereto.

Hereinafter, an embodiment of the support part 102 according to the present disclosure will be described with reference to FIGS. 5A, 5B, 6A, and 6B.

Figure 5A:
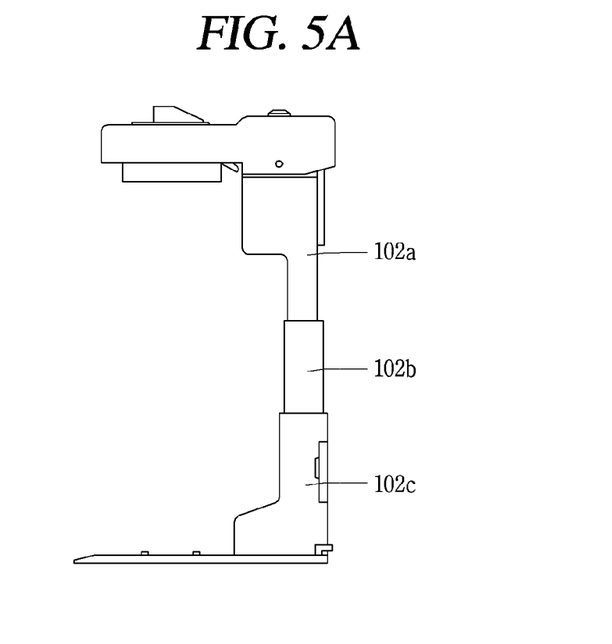
FIG. 5A is a view illustrating an embodiment of a support unit of a charging device of a moving robot according to the present disclosure.

Referring to FIG. 5A, the support part 102 may include a plurality of rod parts 102a, 102b, and 102c. Here, the plurality of rod parts 102a, 102b, and 102c may have different diameters and sequentially coupled with respect to the formed diameters.

Figure 5B:
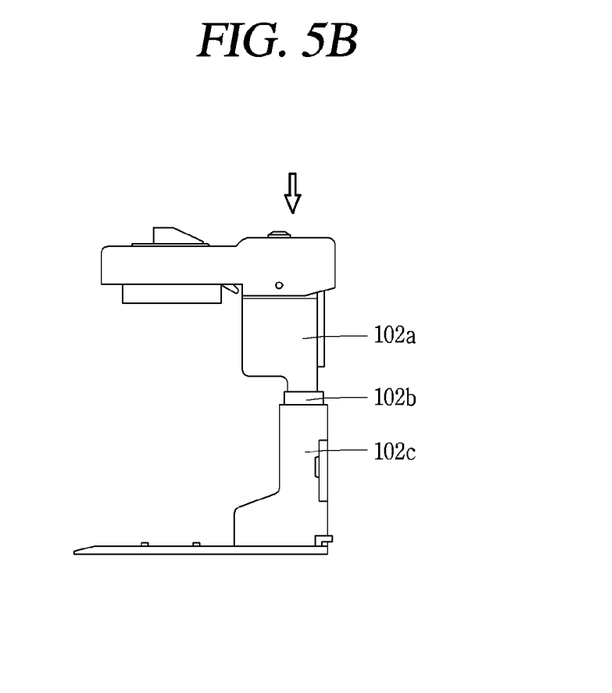
FIG. 5B is another view illustrating an embodiment of a support unit of a charging device of a moving robot according to the present disclosure.

Also, as illustrated in FIG. 5B, a length of the support may be changed as a coupling state of the plurality of rod parts is changed.

In an example, each of the rod parts may have a hole member (not shown) and a pin member (not shown) for fixing a coupled state, and when a hole member of the first rod part 102a and a pin member of the second rod part 102b are coupled, a coupled state of the first rod part and the second rod part may be maintained.

In another example, when the coupled state of the hole member of the first rod part 102a and the pin member of the second rod part 102b is released, the coupled state of the first rod part and the second rod part may be changed. That is, when coupling of the hole member and the pin member is released, the first rod part 102a may enter more deeply the inside of second rod part 102b or may be externally drawn out.

In another example, the charging device 100 may further include a controller (not shown). When it is determined that power supply to the moving robot 10 is not performed, the controller may perform control to change a coupled state of the plurality of rod parts. In detail, when it is determined that power supply is not performed, the controller may perform control to change the coupled state of the plurality of rod parts such that a length of the support part is reduced.

Also, in another example, the controller may determine whether the moving robot 10 is approaching the charging device 100 using information received from the sensor 112. Here, the controller may change a coupled state of the plurality of rod parts in order to increase a length of the support part such that power can be supplied to the moving robot 10.

Meanwhile, although not shown in FIGS. 5A and 5B, first and second coupling maintaining members (not shown) for maintaining a coupled state of the first and second rod parts may be provided in the coupled portion of the first rod part 102a and the second rod part 102b. The first and second coupling maintaining members may be configured to resist an external force applied to the support part such that coupling of the first rod part and the second rod part is not released.

Figure 6A:
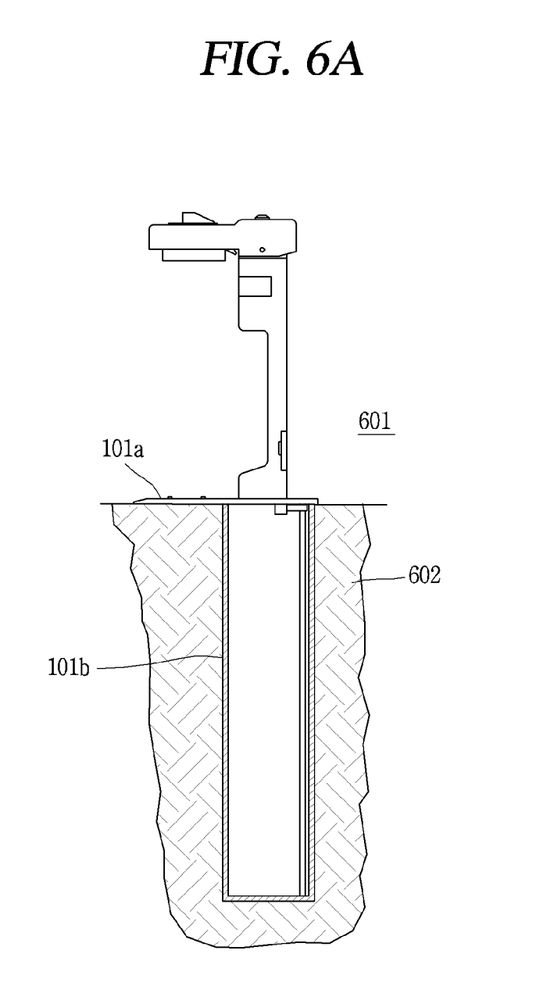
FIG. 6A is another view illustrating an embodiment of a support unit of a charging device of a moving robot according to the present disclosure.

Referring to FIG. 6A, the bottom part 101 of the charging device 100 according to the present disclosure may include a first bottom member 101a installed on the ground and a second bottom member 101b embedded underground. In detail, the second bottom member 101b may be formed to be larger than a horizontal width of the support part.

Figure 6B:
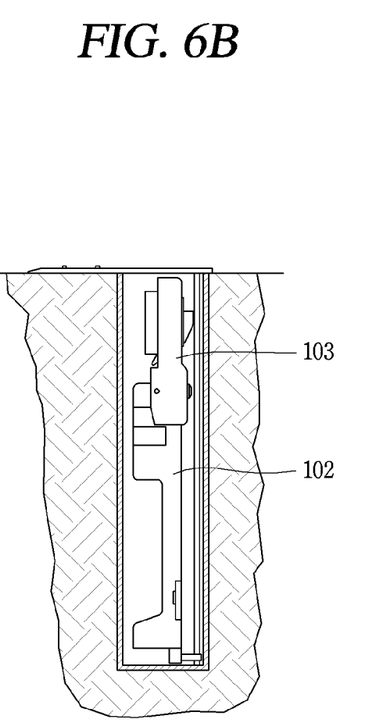
FIG. 6B is another view illustrating an embodiment of a support unit of a charging device of a moving robot according to the present disclosure.

Also, referring to FIG. 6B, the support part 102 coupled to the bottom part 101 and the terminal part 103 coupled to the support part 102 may enter the inside of the second bottom member 101b according to a change in a coupled state of the bottom part, the support part, and the terminal part.

For example, change in the coupled state of the bottom part, the support part, and the terminal part may result from an external force from a user or may be made by the controller of the charging device 100. Also, in another example, the bottom part 101 may have a sensor.

Accordingly, when the charging device 100 does not perform power supply, an installed volume of the charging device 100 may be minimized to enhance user convenience.

Hereinafter, an embodiment related to the rear side of the support part 102 of the charging device 100 according to the present disclosure will be described with reference to FIG. 7.

Figure 7:
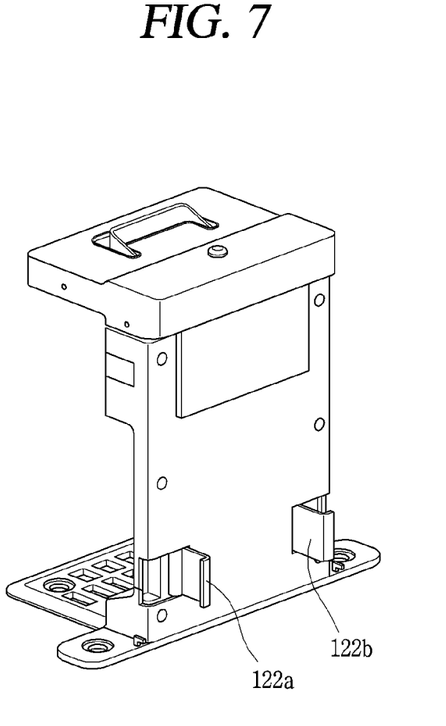
FIG. 7 is a view illustrating an embodiment of a rear surface of a support unit of a charging device of a moving robot according to the present disclosure.

As illustrated in FIG. 7, wire caps 122a and 122b may be provided on the left and right sides of a rear side of the support part 102.

In an embodiment, when the charging device 100 and the boundary wire 1200 are connected to the same power source, the wire cap 122 may cover a binding member of the boundary wire 1200 and the charging device 100.

In another example, the wire cap 122 may cover binding members of the charging device 100 and a power supply wire (not shown) separately connected to the boundary wire 1200.

According to the present disclosure, damage to the lawn present within an operation region of the robotic lawn mower may be minimized when the charging device for supplying power to the robotic lawn mower. Also, according to the present disclosure, since the charging device not interfering with an operation of the robotic lawn mower is provided, operation efficiency of the robotic lawn mower may be increased. Also, according to the present disclosure, since a size of an installation region of the charging device and a size of the charging device are reduced, user convenience of the robotic lawn mower may be enhanced.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A charging device for a moveable robot, the charging device comprising:
a bottom part having a top surface, the bottom part being arranged to receive at least one wheel of the moveable robot on the top surface;
a support part coupled to the bottom part and extending in an upward direction relative to the top surface; and
a terminal part coupled to the support part and positioned above the moveable robot when the robot is positioned on the top surface,
wherein the terminal part is coupled to the support part by a hinge part and a spring,
wherein a coupling angle of the terminal part relative to the support part is changed by the hinge part and the spring such that when an external force is applied to the terminal part by the moveable robot,
the coupling angle is returned to an initial value when an external force applied to the terminal part is removed, and
wherein the charging device is configured to charge the moveable robot when the at least one wheel is positioned on the top surface of the bottom part.

2. The charging device of claim 1, wherein the at least one wheel that is positioned on the top surface of the bottom part is a main driving wheel.

3. The charging device of claim 2, wherein the bottom part comprises a plurality of holes.

4. The charging device of claim 1, wherein the support part is adjustably coupled to the bottom part.

5. The charging device of claim 1, wherein the support part comprises a concave portion that faces the moveable robot when the at least one wheel of the moveable robot is positioned on the top surface of the bottom part.

6. The charging device of claim 1, further comprising an IR sensor to transmit a preset signal to the robot.

7. The charging device of claim 1, wherein
the support part is formed of a plurality of rod parts,
the plurality of rod parts each having different diameters and sequentially coupled, and
when the coupled state of the plurality of rod parts is adjusted, a length of the support part is changed so as to increase or decrease the distance between the bottom part and the terminal part.

8. The charging device of claim 1, wherein
the bottom part includes
a first bottom member positioned on the ground and
a second bottom part positioned below the ground,
wherein at least one of the support part and the terminal part is positioned inside the second bottom member according to an adjustment of the coupled state between the support part and the terminal part.

9. The charging device of claim 1, wherein at least one of the bottom part and the support part comprises a fastening part that is connected to a boundary wire defining an operation region for the moveable robot.

10. The charging device of claim 9, wherein the bottom part may be installed such that one surface thereof is in contact with the boundary wire.

11. The charging device of claim 1, wherein when an absolute value of an angle between a rotational shaft of the at least one wheel and a plane of the bottom part is within a preset range, the charging device is configured to supply power to the moveable robot through the terminal part when the moveable robot is positioned on the top surface of the bottom part.

12. The charging device of claim 1, wherein when an absolute value of an angle between a rotational shaft of the at least one wheel and a plane of the bottom part is within a preset range, the coupling angle of the terminal part relative to the support part is changed so as to maintain contact between the terminal part and the moveable robot when the moveable robot is positioned on the top surface of the bottom part.

13. The charging device of claim 1, whereby the external force includes a first external force that is applied to the terminal part in a direction horizontal to the ground and a second external force that is applied to the terminal part in a direction perpendicular to the ground.

14. The charging device of claim 1, wherein the terminal part comprises a terminal that contacts the moveable robot when the moveable robot is positioned on the top surface of the bottom part.

* * * * *